United States Patent
Tanioka

(10) Patent No.: US 6,490,098 B2
(45) Date of Patent: Dec. 3, 2002

(54) LENS BARREL

(75) Inventor: Hiroshi Tanioka, Kashiwa (JP)

(73) Assignee: Nikon Corporation, Tokyo (JP)

( * ) Notice: Subject to any disclaimer, the term of this patent is extended or adjusted under 35 U.S.C. 154(b) by 61 days.

(21) Appl. No.: 09/836,184

(22) Filed: Apr. 18, 2001

(65) Prior Publication Data

US 2001/0033431 A1 Oct. 25, 2001

(30) Foreign Application Priority Data

Apr. 20, 2000 (JP) ........................................ 2000-119818

(51) Int. Cl.$^7$ ............................................... G02B 15/14
(52) U.S. Cl. ...................................... 359/696; 359/702
(58) Field of Search ................................. 359/694, 695, 359/696, 697, 698, 701, 702; 396/214, 475, 476, 477, 478

(56) References Cited

U.S. PATENT DOCUMENTS 4,397,528 A * 8/1983 Kamata ...................... 359/696
4,466,709 A * 8/1984 Osawa ........................ 359/696
5,164,860 A * 11/1992 Suzuki et al. ................ 359/696
5,648,876 A * 7/1997 Tanioka ....................... 359/701

FOREIGN PATENT DOCUMENTS

JP 57-66425 4/1982

* cited by examiner

Primary Examiner—Huy Mai
(74) Attorney, Agent, or Firm—Miles & Stockbridge P.C.

(57) ABSTRACT

A lens barrel comprises an optical system provided within a main body of the barrel, an operation ring used for a photographer to operate the optical system, driving means, used for an electric drive, for generating a driving force transferred to the operation ring via a driving force transfer member, and a rotation restricting stopper for restricting a range of rotation of the operation ring. The rotation restricting stopper is movable between a position for restricting the range of the rotation of the operation ring and a position where the range of the rotation is not restricted, and substantially simultaneously restricts a range of rotation of the driving force transfer member in the position for restricting the range of the rotation of the operation ring.

2 Claims, 6 Drawing Sheets

LENS BARREL

This application claims the benefit of Japanese Patent Application No. 2000-119818 which is hereby incorporated by reference.

BACKGROUND OF THE INVENTION

1. Field of the Invention

The present invention relates to a lens barrel mounted to a camera etc, and more particularly to a lens barrel constructed to prevent a deformation of an operation ring when restricting a rotation.

2. Related Background Art

A single focus lens or a zoom lens is mounted in a lens interchange type camera. The lens barrel includes a plurality of lens units each composed of a single or a plurality of optical lenses. A photographer (or an actuator incorporated into the lens barrel or a camera) properly changes a distance between the lens units, whereby focusing is performed. A main trend of the cameras over the recent years is a type of having an auto focusing mode in which the focusing is executed by the camera itself in addition to a manual focus mode in which a photographer performs the focusing by rotating a manual focus ring provided on an outer peripheral surface of the barrel. A main body of this type of camera incorporates a focusing drive mechanism constructed of a microcomputer, a CCD sensor etc. This mechanism has a structure in which when a distance to an object is detected, an electric motor built in the main body of the camera or the lens barrel moves a focusing lens unit forward or backward. On the other hand, there exists a lens barrel which, as disclosed in Japanese Patent Application Laid-Open Publication No.57-66425, includes a focusing restriction mechanism capable of focusing up to a macro photographing region within a range of only a predetermined focal length.

The lens barrel shown in FIGS. 3 and 4 is what the above focusing restriction mechanism is added to a lens barrel having the manual focus mode and the auto focus mode. A second lens unit holding frame 32 for holding a second lens unit 10 which is a focus lens unit, is slidably held within a fixed drum 1 in case of the lens barrel shown in FIGS. 3 and 4. A second pin 36 embedded into the second lens unit holding frame 32 engages with a clearance groove 42 formed in the fixed drum 1 and with a second cam groove 48 formed in a zoom cam ring 45. A drive lever 57 having a straight groove 55 extends on the side of an inner periphery of a manual focus ring 51, and the second pin 36 engages with a straight groove 55. On the other hand, a pinion 29 driven by the electric motor within the main body (unillustrated) of the camera is rotatably held at a rear side end of the fixed drum 1. This pinion 29 meshes with an internal gear ring 21 rotatably held by the fixed drum 1. A rear side end of the drive lever 57 engages with the internal gear ring 21, and the internal gear ring 21 and the drive lever 57 (i.e., the manual focus ring, 51) rotate integrally.

A rotation restricting stopper 61 movable back and forth is provided on an upper surface of the fixed drum 1. This rotation restricting stopper 61 fits in a focus ring sided engagement groove 63 when moving forward, and restricts a rotation of the manual focus ring 51 within a predetermined angular range (∞~1 m on a range marker in FIG. 4). The rotation restricting stopper 61 fits in a zoom ring sided engagement groove 65 when moving backward, and restricts a rotation of the zoom ring 53 within a predetermined angular range (50~85 mm on a focus range marker in FIG. 4). These rotational restrictions aim at meeting demands in terms of optical performance and preventing a collision between the optical systems. Note that the drive lever 57 engages with either of engagement ends 67, 69 formed on the fixed drum 1 and extending in a wide range in the direction of an optical axis, whereby the rotation of the manual focus ring 51 is, as shown in FIG. 5, restricted in the range of ∞~0.5 m on the range marker.

In the lens barrel described above, when the rotation restricting stopper 61 restricts the rotation of the manual focus ring 51, an unnecessary force might act on the manual focus ring 51 or on the drive lever 57.

The manual focus ring 51 is, when the rotation restricting stopper 61 fits in the focus ring sided engagement groove 63, restricted in its rotation within the range of ∞~1 m as described above. When auto-focusing, however, a drive control device within the main body of the camera, even after the manual focus ring 51 has rotated to a limit position of the rotational restriction, outputs a drive current to the electric motor in an extremely short period of time till it detects this and outputs a stop command. As a result, the internal gear ring 21 receives a driving force in a so-called overrun direction in spite of the manual focus ring 51 being restricted in its rotation.

On this occasion, a side end surface of the drive lever 57 engages with the engagement end 69 in the wide range on the infinity(∞)side. Therefore, the overrun of the internal gear ring 21 is hard to occur, and almost no deformation of the drive lever 57 occurs. On the 1 m side, however, if the driving force acts on the internal gear ring 21, the drive lever 57 kept in a state where one side end thereof is engaged with the rotation restricting stopper 61 through the manual focus ring 51, receives a comparatively large stress caused by a rotational moment of the internal gear ring 21 and gets flexural in an arrow direction in FIG. 6. As a consequence, the internal gear ring 21 overruns by a predetermined quantity, with the result that the drive lever 57 deforms with bending and a connecting portion between the manual focus ring 51 and the drive lever 57 is damaged. Then, for preventing these drawbacks, if a thickness of each of the manual focus ring 51 and the drive lever 57 is increased, or if a material is changed (for instance, a metal is used as a substitute for a synthetic resin used so far), it is difficult to reduce the lens barrel both in size and in weight, and, in addition, a manufacturing cost inevitably increases.

SUMMARY OF THE INVENTION

It is a primary object of the present invention, which was devised under such circumstances, to provide a lens barrel capable of preventing a deformation of an operation ring when restricting its rotation by taking a comparatively simple structure.

To accomplish the above object, according to the present invention, a lens barrel comprises an optical system provided within a main body of the barrel, an operation ring used for a photographer to operate the optical system, a driving unit, used for an electric drive, for generating a driving force transferred to the operation ring via a driving force transfer member, and a rotation restricting stopper for restricting a range of rotation of the operation ring, wherein the rotation restricting stopper is movable between a position for restricting the range of the rotation of the operation ring and a position where the range of the rotation is not restricted, and substantially simultaneously restricts a range of rotation of the driving force transfer member in the position for restricting the range of the rotation of the operation ring.

According to the present invention, the rotation restricting stopper substantially simultaneously restricts the ranges of the operation ring and of the driving force transfer member, and therefore an unnecessary force acts neither on the operation ring nor on the drive lever for connecting the operation ring to the driving force transfer member.

In lens barrel according to the present invention, it is preferable that the optical system is a focusing optical system, the operation ring is a manual focus ring, and the driving force transfer member is a ring gear. In this case, for example, the rotation restricting stopper is structured such that when its front side end fits in the focus ring sided engagement groove of the manual focus ring, its rear side end engages with an engagement protrusion formed on a ring gear to a limit of the rotational range.

DESCRIPTION OF THE PREFERRED EMBODIMENT

Figure 1:
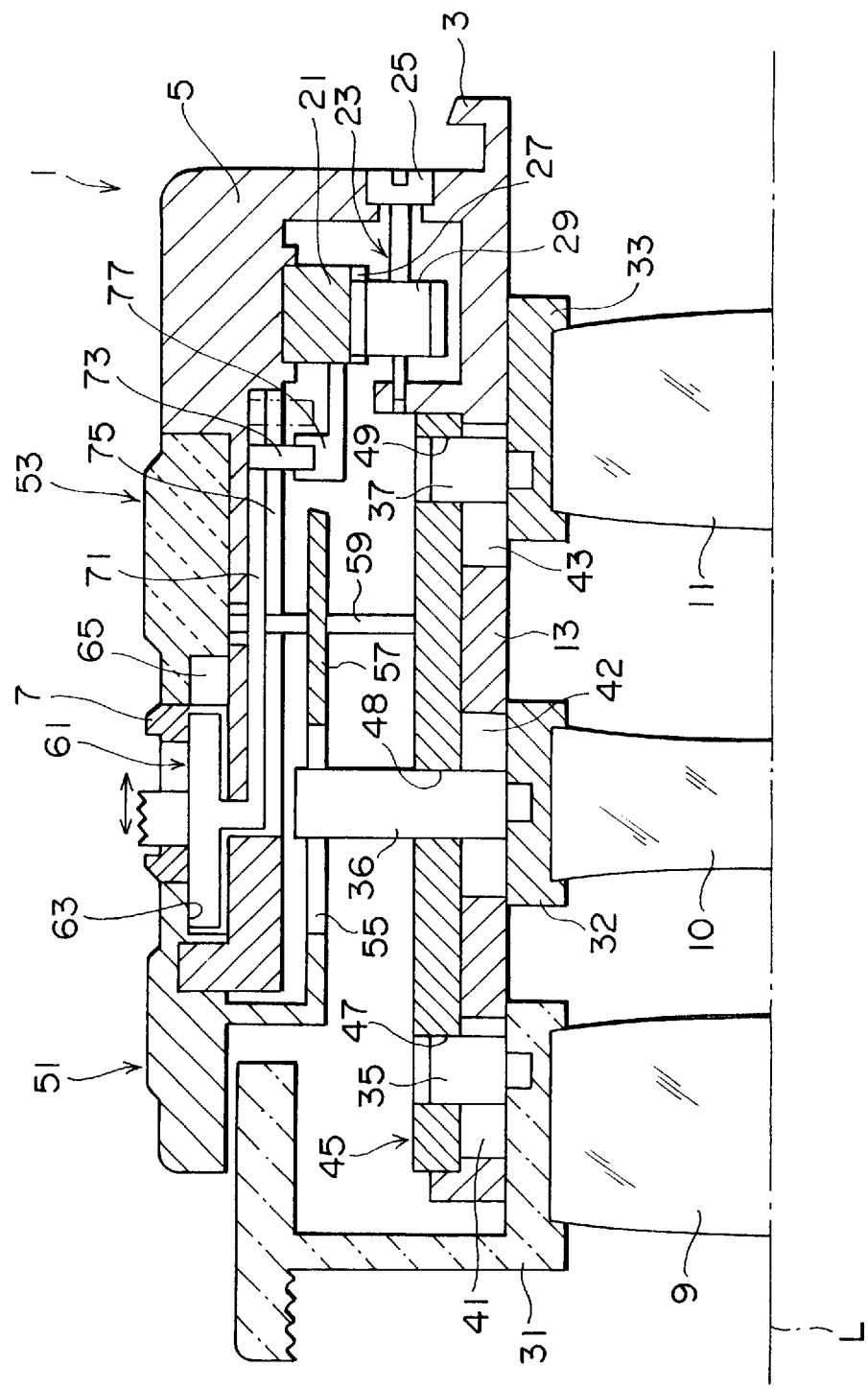
FIG. 1 is a vertical sectional view showing a lens barrel in one embodiment of the present invention.
Figure 2:
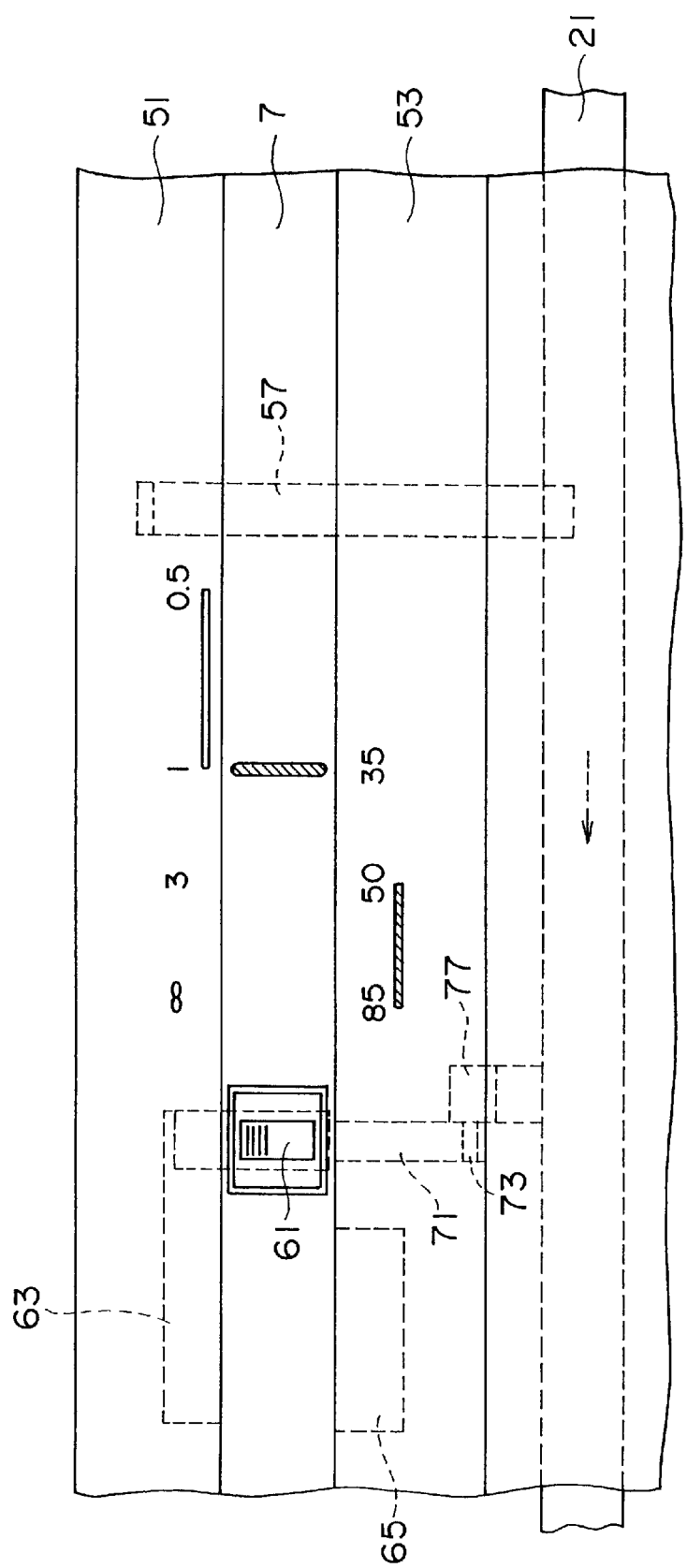
FIG. 2 is a development of the same lens barrel.
Figure 3:
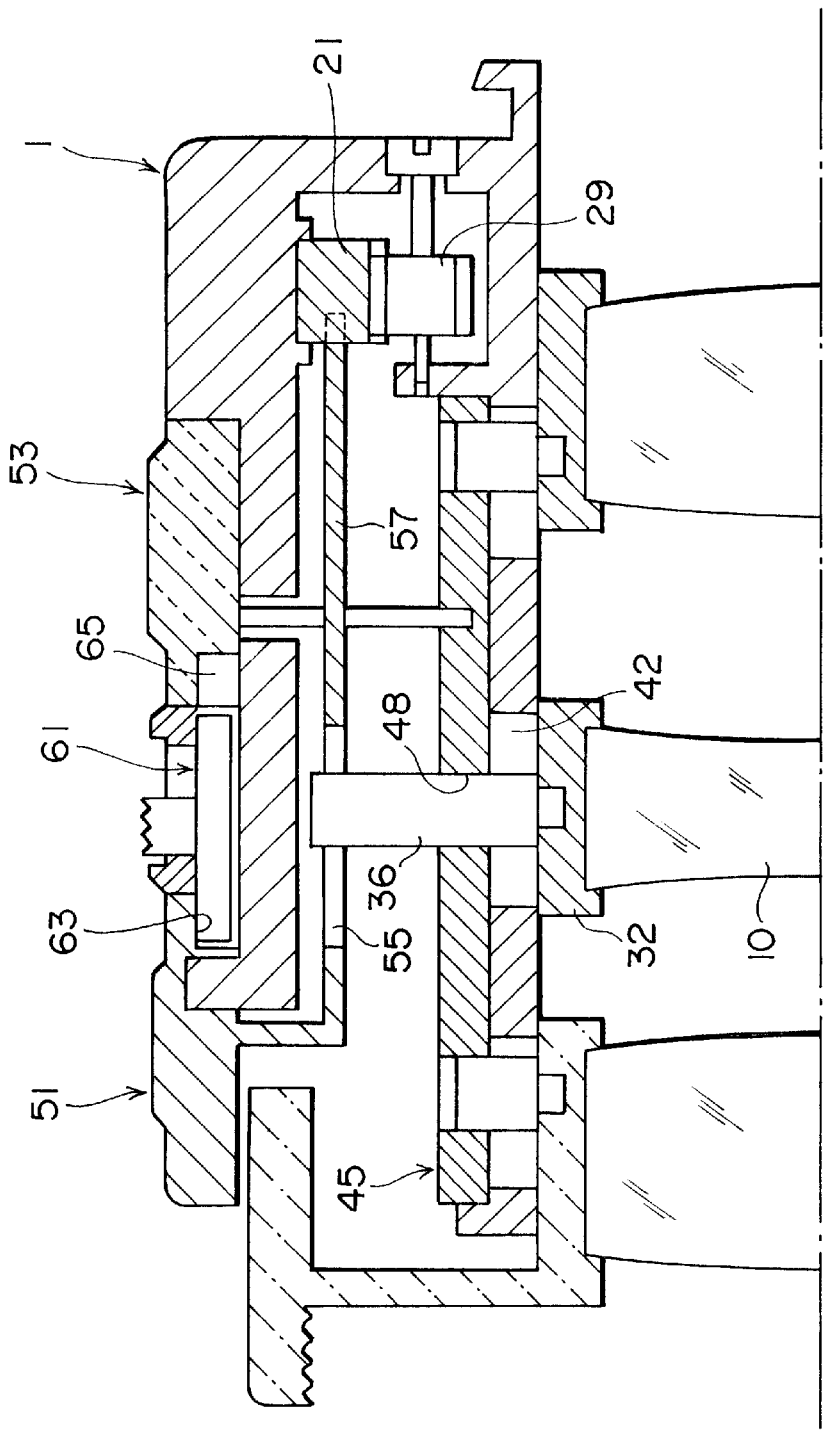
FIG. 3 is a vertical sectional view showing a conventional lens barrel.
Figure 4:
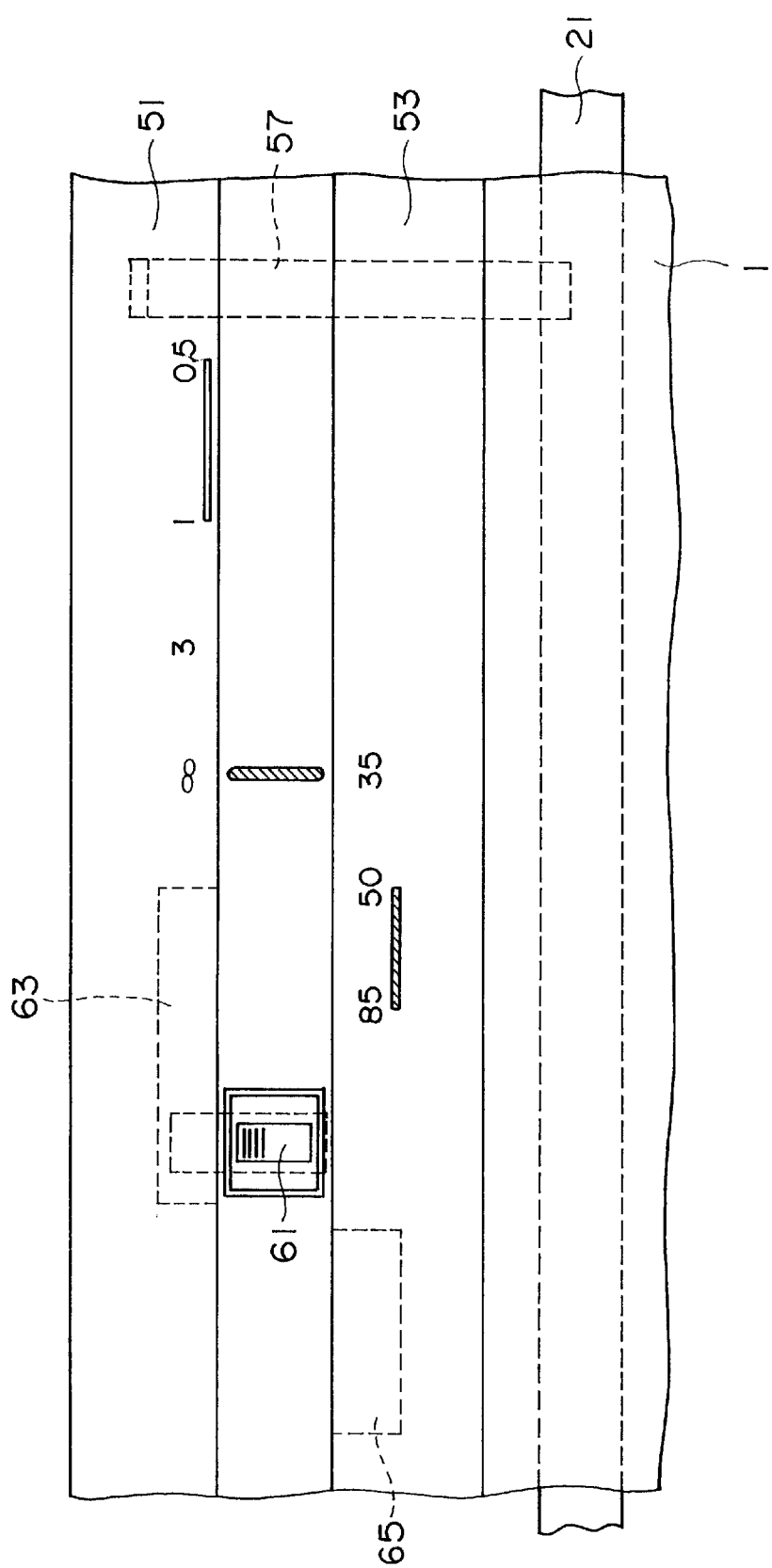
FIG. 4 is a development of the conventional lens barrel.

One embodiment of the present invention will hereinafter be described with reference to the accompanying drawings. FIG. 1 is a vertical sectional view showing a lens barrel in one embodiment of the present invention. FIG. 2 is a development of the same lens barrel.

Referring to FIG. 1, a member designated by the numeral 1 is a cylindrical fixed drum fitted to a camera (unillustrated). The fixed drum 1 is constructed of a rear fixed drum 5 formed with a plurality of bayonet lugs 3 at a rear side end thereof, an outer fixed drum 7 configuring a part of an outer shell of the barrel, and an inner fixed drum 13 for holding first through third lens units 9–11. A symbol L in FIG. 1 represents an optical axis of the lens barrel.

An internal gear ring 21 and a barrel-sided coupler 23 are rotatably held in the rear fixed drum 5. The barrel-sided coupler 23 is formed at its rear side end with a coupling portion 25 engaging with an unillustrated camera-sided coupler. The barrel-sided coupler 23 is formed at its front side end with a pinion 29 meshing with a gear 27 of the internal gear ring 21. Accordingly, when the camera-sided couple is rotationally driven by an unillustrated electric motor within the camera, its rotations are transferred to the internal gear ring 21 via the barrel-sided coupler 23, whereby the internal gear ring 21 rotates about the optical axis L in any one of forward and reverse directions.

First through third lens unit holding frames 31–33 for holding the first through third lens units 9–11, are slidably fitted in the inner fixed drum 13. First through third pins 35–37 are embedded in these lens unit holding frames 31–33. The first and third pins 35, 37 are engaged with straight grooves 41, 43 formed in the inner fixed drum 13, and the second pin 36 is loosely fitted in a clearance groove 42 formed in the inner fixed drum 13. A zoom cam ring 45 is rotatably fitted on the inner fixed drum 13. The first through third pins 35–36 of the first through third lens unit holding frames 31–33 are engaged with first through third cam grooves 47–49 formed in this zoom cam ring 45.

A manual focus ring 51 is rotatably held at a front side end of the outer fixed drum 7. A zoom ring 53 is rotatably held at a rear side end of the same drum 7. A drive lever 57 formed with a straight groove 55 extends on the side of an inner periphery of the manual focus ring 51. The tip of the second pin 36 engages with the straight groove 55. Further, a rear side end of the drive lever 57 engages with the internal gear ring 21 (referring to FIG. 2, the tip of the drive lever 57 is cut away in FIG. 1 for simplicity of illustration), and the internal gear ring 21 and the drive lever 57 (i.e., the manual focus ring 51) integrally rotate. On the other hand, a connection bar 59 connected to the zoom cam ring 45 is formed on an inner peripheral surface of the zoom ring 53, and the zoom ring 53 and the zoom cam ring 45 integrally rotate.

Figure 5:
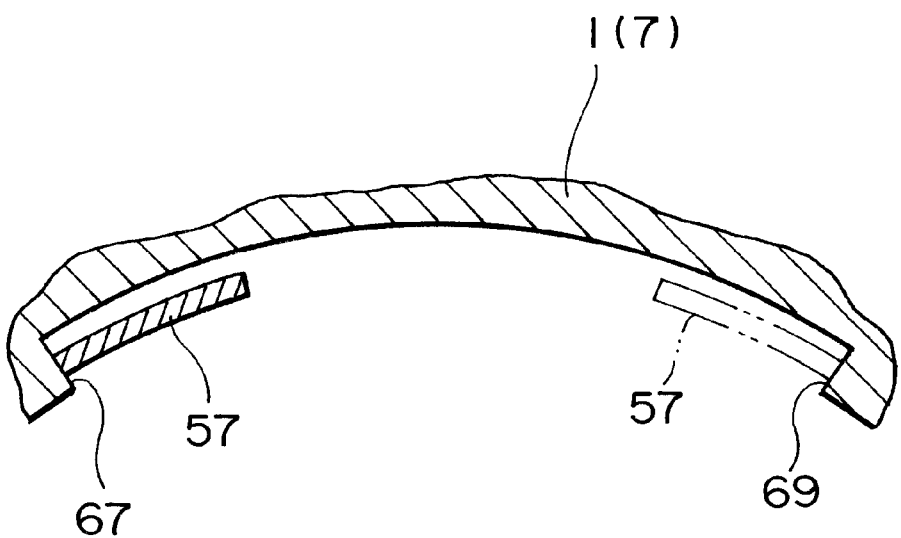
FIG. 5 is a principal cross-sectional view showing a part of the conventional lens barrel.
Figure 6:
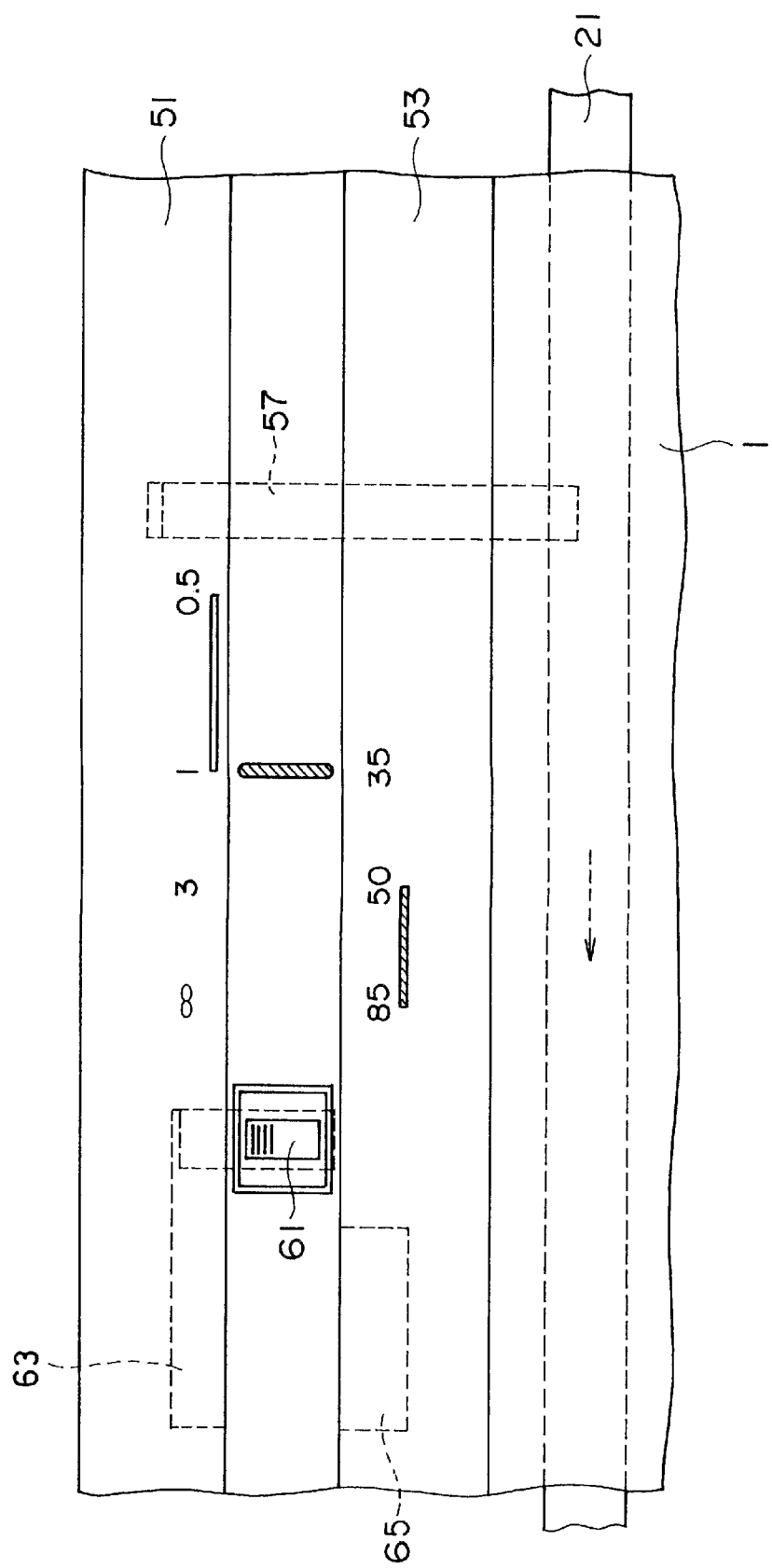
FIG. 6 is a development of the conventional lens barrel.

A rotation restricting stopper 61 is held on the outer fixed drum 7 so as to be movable back and forth between the manual focus ring 51 and the zoom ring 53. The rotation restricting stopper 61, when moving forward, fits in a focus ring sided engagement groove 63 and thus restricts a rotation of the manual focus ring 51 in a range of a predetermined angle (∞~1 m on a range marker in FIG. 2). The rotation restricting stopper 61, when moving backward, fits in a zoom ring sided engagement groove 65 and thus restricts a rotation of the zoom ring 53 in a range of a predetermined angle (50~85 mm on a focus range marker in FIG. 2). Note that the drive lever 57 engages with engagement side ends 67, 69 formed on the outer fixed drum 7, whereby the rotation of the manual focus ring 51 is as shown in FIG. 5, restricted in a range of ∞~0.5 m on the range marker.

In this embodiment, an engagement lever 71 extends inwardly of the rotation restricting stopper 61 toward the rear fixed drum 5, and a rear side end of the engagement lever 71 is formed with an engagement portion 73 protruding inwards. The engagement lever 71 is fitted in a straight groove 75 formed in an inner peripheral surface of the outer fixed drum 7, and slides within the straight groove 75 with back-and-forth movements of the rotation restricting stopper 61. On the other hand, an engagement protrusion 77 is provided on a front surface of the internal gear ring 21. Just when the manual focus ring 51 rotates to a position of 1 m on the range marker, a phase of the engagement protrusion 77 becomes coincident with a phase of the engagement portion 73 on the side of the engagement lever 71.

An operation of this embodiment will hereinafter be explained.

The photographer, when taking a photo in a manual focus mode with the camera mounted with the lens barrel in this embodiment, to begin with, for example, rotates the zoom ring 53 for zooming. Then, the zoom cam ring 45 rotates integrally with the zoom ring 53, and the first through third pins 35–37 fitted in the straight grooves 41, 43 formed in the inner fixed drum 13 and in the straight groove 55 in the drive lever 57, are driven by the first through third cam grooves 47–49. Then, the first through third lens unit holding frames 31–33 move forward or backward by a predetermined quantity, thereby attaining the zooming. On this occasion, if the rotation restricting stopper 61 is in a backward position and fitted in the zoom ring sided engagement groove 65, the rotation of the zoom ring 53 is restricted in a range of 50~85 mm on the focus range marker.

Thereafter, the photographer rotates the manual focus ring 51 in order to perform focusing. Then, the second pin 36 engaging with the straight groove 55 in the drive lever 57 rotates about the optical axis L, thereby moving along the second cam groove 48. Subsequently, the second lens unit holding frame 32 moves forward or backward by a predetermined quantity, thus actualizing the focusing. On this occasion, if the rotation restricting stopper 61 is in a forward position and fitted in the focus ring sided engagement groove 63, the rotation of the manual focus ring 51 is restricted in a range of ∞~1 m on the range marker.

On the other hand, the photographer, when taking a photo in an auto focus mode with the camera mounted with the lens barrel in this embodiment, performs the zooming as in the manual focus mode, and thereafter presses a shutter button in a way that fixes an eye on an object within a viewfinder. Then, a focusing drive control mechanism within a main body of the camera detects a distance to the object, and the built-in electric motor is rotationally driven in any one of the forward and reverse directions. Thereupon, the rotations thereof are transferred to the barrel-sided coupler 23 from an unillustrated camera-sided coupler, and the internal gear ring 21 is rotationally driven by the pinion 29 of the barrel-sided coupler 23. Then, the rear side end of the drive lever 57 engages with the internal gear ring 21, and therefore the drive lever 57 and the manual focus ring 51 rotate integrally, whereby the focusing is actualized as in the manual focus mode.

Now, if the rotation restricting stopper 61 is in the forward position and fitted in the focus ring sided engagement groove 63, the rotation of the manual focus ring 51 is restricted in the range of ∞~1 m on the range marker. The focusing drive control mechanism is, however, unable to instantaneously stop the drive of the electric motor even when the manual focus ring 51 rotates to the position of 1 m on the range marker, whereby there acts a force that causes an overrun of the internal gear ring 21 in a direction of 0.5 m on the range marker. In this embodiment, however, the engagement portion 73 of the engagement lever 71 on the side of the rotation restricting stopper 61 engages with the engagement protrusion 77 on the side of the internal gear ring 21, with the result that the internal gear ring 21 is firmly latched in the position of 1 m on the range marker. It does not happen that an unnecessary force acts on the drive lever 57 and on the manual focus ring 51 as in the conventional apparatus.

This embodiment takes the configuration described above, a strength larger than needed is not required of the manual focus ring 51 and the drive lever 57, thereby making it feasible to downsize the lens barrel and reduce its weight and manufacturing cost.

The discussion on the specific embodiment comes to an end, however, the mode of the present invention is not limited to this embodiment. For example, in this embodiment, the present invention is applied to the lens barrel with the electric motor built in the camera. The present invention may, however, be applied to a lens barrel wherein the electric motor is built in the lens barrel body. Further, the driving force transfer member used for the rotation restricting stopper to restrict the range of rotation may also be a member (pinion etc) for other than the internal gear ring described above, or a driving force transfer member for other than the auto focus mechanism may also be used. Moreover, in the embodiment discussed above, the present invention is applied to the 3-lens-unit type lens barrel but may also be applied to other types of lens barrels. Further, the specific configurations of the focus mechanism, the zoom mechanism etc are not confined to what has been exemplified in the embodiment discussed above, and may be properly changed depending on convenience in terms of design.

The lens barrel according to the present invention includes the driving means used for the electric drive of the optical system within the lens barrel body, and the operation ring used for the photographer to operate the optical system. The driving force from the driving means is transferred to the operation ring via the driving force transfer member, and the lens barrel is provided with the rotation restricting stopper for restricting the range of the rotation of the operation ring. The rotation restricting stopper is movable between the position for restricting the range of the rotation of the operation ring and the position where the range of the rotation is not restricted. Besides, the rotation restricting stopper substantially simultaneously restricts the range of rotation of the driving force transfer member in the position for restricting the range of the rotation of the operation ring. Therefore, the unnecessary force does not act on the operation ring and on the drive lever for connecting the operation ring to the driving force transfer member, thereby downsizing the lens barrel and reducing its weight and manufacturing cost as well.

What is claimed is:

1. A lens barrel comprising:

an optical system provided within a main body of said barrel;

an operation ring used for a photographer to operate said optical system;

driving means, used for an electric drive, for generating a driving force transferred to said operation ring via a driving force transfer member; and a rotation restricting stopper for restricting a range of rotation of said operation ring, wherein said rotation restricting stopper is movable between a position for restricting the range of the rotation of said operation ring and a position where the range of the rotation is not restricted, and substantially simultaneously restricts a range of rotation of said driving force transfer member in the position for restricting the range of the rotation of said operation ring.

2. A lens barrel according to claim 1, wherein said optical system is a focusing optical system, said operation ring is a manual focus ring, and said driving force transfer member is a ring gear.

* * * * *